(12) United States Patent  
Shaffer et al.

(10) Patent No.: US 7,099,280 B1  
(45) Date of Patent: Aug. 29, 2006

(54) METHOD AND SYSTEM FOR LOGGING VOICE QUALITY ISSUES FOR COMMUNICATION CONNECTIONS

(75) Inventors: Shmuel Shaffer, Palo Alto, CA (US); Joseph F. Khouri, San Jose, CA (US); Michael E. Knappe, Sunnyvale, CA (US); Robert T. Bell, Bountiful, UT (US)

(73) Assignee: Cisco Technology, Inc., San Jose, CA (US)

( * ) Notice: Subject to any disclaimer, the term of this patent is extended or adjusted under 35 U.S.C. 154(b) by 925 days.

(21) Appl. No.: 09/821,536

(22) Filed: Mar. 28, 2001

(51) Int. Cl.  
*G06F 11/00* (2006.01)

(52) U.S. Cl. .................... 370/252; 370/352

(58) Field of Classification Search .............. 370/241, 370/241.1, 352, 389, 295.21, 355, 356, 252, 370/231, 230.1, 242, 248, 249; 375/224; 379/1.01, 1.02, 3, 27.01–27.08, 900  
See application file for complete search history.

(56) References Cited

U.S. PATENT DOCUMENTS

| | | | |
|---|---|---|---|
| 6,233,320 B1* | 5/2001 | Haimi-Cohen | 379/88.27 |
| 6,246,978 B1* | 6/2001 | Hardy | 704/201 |
| 6,282,192 B1* | 8/2001 | Murphy et al. | 370/352 |
| 6,360,271 B1* | 3/2002 | Schuster et al. | 709/231 |
| 6,363,065 B1* | 3/2002 | Thornton et al. | 370/352 |
| 6,512,746 B1* | 1/2003 | Sand | 370/252 |
| 6,515,964 B1* | 2/2003 | Cheung et al. | 370/230 |
| 6,700,953 B1* | 3/2004 | Maurer et al. | 379/88.01 |
| 6,807,150 B1* | 10/2004 | McNiff et al. | 370/230 |
| 2002/0012422 A1* | 1/2002 | Kashiwagi | 379/67.1 |

OTHER PUBLICATIONS

Pending Patent Application: Michalewicz, Larry G., *Method and System for Logging Debugging Information for Communication Connections*, U.S. Appl. No. 09/742,466, filed Dec. 20, 2000.

\* cited by examiner

*Primary Examiner*—Brian Nguyen  
(74) *Attorney, Agent, or Firm*—Baker Botts L.L.P.

(57) ABSTRACT

A method and system for logging voice quality issues for a communication connection includes receiving a signal for logging quality information for a voice connection at an endpoint of the voice connection. Voice samples are collected from the voice connection at the endpoint. The voice samples are stored in an error log at the endpoint.

48 Claims, 2 Drawing Sheets

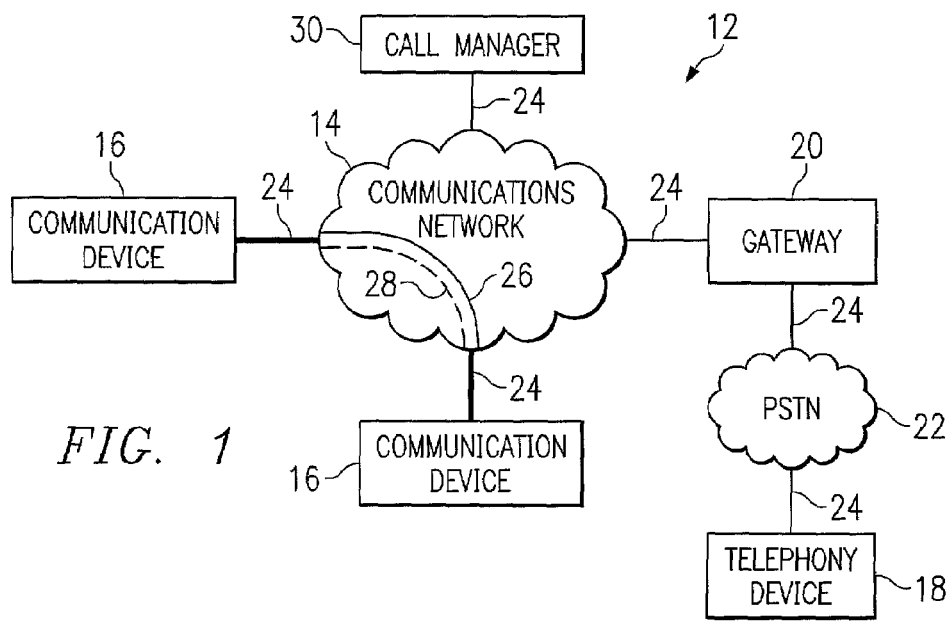
FIG. 1
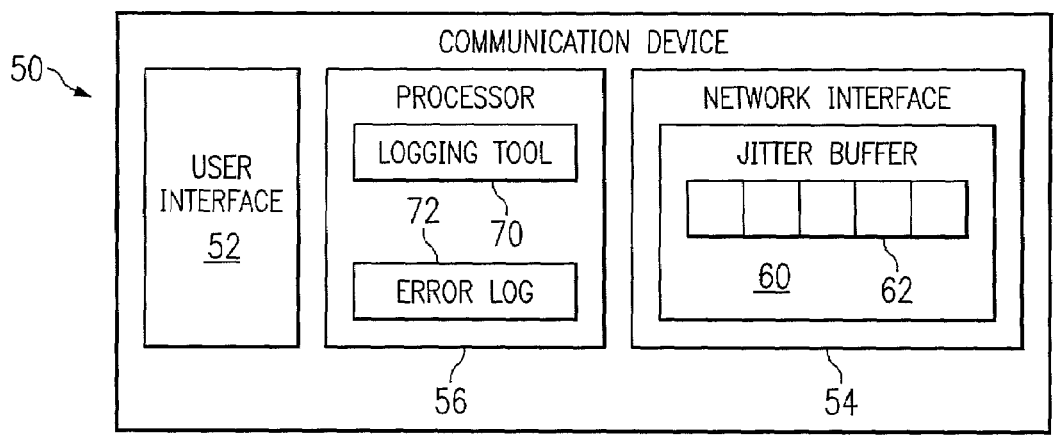
FIG. 2
FIG. 3

METHOD AND SYSTEM FOR LOGGING VOICE QUALITY ISSUES FOR COMMUNICATION CONNECTIONS

TECHNICAL FIELD OF THE INVENTION

The present invention relates generally to field of communication systems, more particularly to a method and system for logging voice quality issues for communication connections.

BACKGROUND OF THE INVENTION

Telephones and other communications devices for sending audio information through the public switched telephone network (PSTN) have existed for a substantial period of time and are well understood. Recently, however, telephones have been created that exchange audio information through packet switched networks such as the Internet. These telephones use a digitized format that breaks down audio information into discrete Internet protocol (IP) packets. These voice over IP (VoIP) packets are sent and received through the packet switched network.

Exchanging audio information through a packet switched network presents a variety of problems. For example, errors in the packet transmission may result in echo, scratchy audio, dropped calls, delay and jitter in the audio string. These problems are compounded by the inability to debug intermittent voice quality issues in VoIP systems. Methods of notifying a repair staff are ineffective because users are unable to convey relevant information, such as the delay, and/or volume of an echo or the frequency of a buzz. Furthermore, often critical information is completely unavailable to the user, such as operating statistics. As long as the voice quality of VoIP is perceived to be inferior to the voice quality of traditional telephony systems, users will remain reluctant to employ VoIP systems.

Previous attempts to solve these problems include allowing a user to initiate a one-second recording of a call by depressing a certain series of buttons on a telephone keypad. This and other functionality using network-based resources was not completely effective in that the particular second of audio recorded may not have been the same audio in which the user was experiencing a problem or may not have provided an accurate representation of the audio the user was experiencing.

SUMMARY OF THE INVENTION

The present invention provides a method and system for logging voice quality issues for communication connections that substantially eliminate or reduce the disadvantages and problems associated with previous systems and methods. In one embodiment, the present invention collects voice samples and/or associated parameters at an endpoint on demand and stores them for debugging or other analysis.

In accordance with a particular embodiment of the present invention, a method and system for logging voice quality issues includes receiving a signal for logging quality information for a voice connection at an endpoint of the voice connection. Voice samples are collected from the voice connection at the endpoint. The voice samples are stored in an error log at the endpoint.

More specifically, in accordance with a particular embodiment of the present invention, system parameters indicative of quality of the voice connection may also be collected at the endpoint. In this embodiment, the system parameters may be synchronized with corresponding voice samples and stored together in the error log. The system parameters include a plurality of lost/late packet counts, convergent state of echo cancelers, number of packets stored in a jitter buffer and end-to-end latency of the voice connection at the endpoint.

Technical advantages of the present invention include providing an improved method and system for logging voice quality issues for a communication connection. In a particular embodiment, the present invention collects voice samples and associated system parameters at an endpoint of the communication connection on demand. As a result, an accurate representation of what the user has heard and/or experienced is provided for debugging operations. Thus, prompt solutions are provided to problems and voice quality is enhanced.

Another technical advantage of one or more embodiments of the present invention includes providing a user mechanism for triggering the collection of voice degradation samples and quality related statistics from a local endpoint such as an Internet protocol (IP) telephone or a remote endpoint such as a gateway. Voice quality statistics may include a number of packets in the jitter buffer, packet time of arrival and the like. As a result, the language barriers experienced by users when they attempt to describe a voice degradation issue is removed. This aids in identifying network and other problems and improves efficiency of troubleshooting engines and debugging operations.

Another technical advantage of one or more embodiments of the present invention includes providing a method and system for triggering from a near side the sample collection on a remote side endpoint. According, full and accurate information is recorded for problematic calls which allows fast and efficient error correction. The remote endpoint may be a gateway, IP phone and the like.

Yet another technical advantage of one or more embodiments of the present invention includes providing a voice over IP (VoIP) system with distributed debugging intelligence. In particular, trigger and collection mechanisms for voice quality issues are located at the endpoints at the periphery of the network. This allows the ready introduction of new debugging technologies into the VoIP system and minimizes network costs.

Other technical advantages of the present invention will be apparent to one skilled in the art from the following figures, description and claims.

BRIEF DESCRIPTION OF THE DRAWINGS

For a more complete understanding of the present invention and its advantages, reference is now made to the following description taken in conjunction with the accompanying drawings, wherein like numerals represent like parts, in which:

FIG. 1 is a block diagram illustrating a communication system in accordance with one embodiment of the present invention;

FIG. 2 is a block diagram illustrating details of a communication device of FIG. 1 in accordance with one embodiment of the present invention;

FIG. 3 is a block diagram illustrating details of the error log of FIG. 2 in accordance with one embodiment of the present invention;

DETAILED DESCRIPTION OF THE INVENTION

Figure 4:
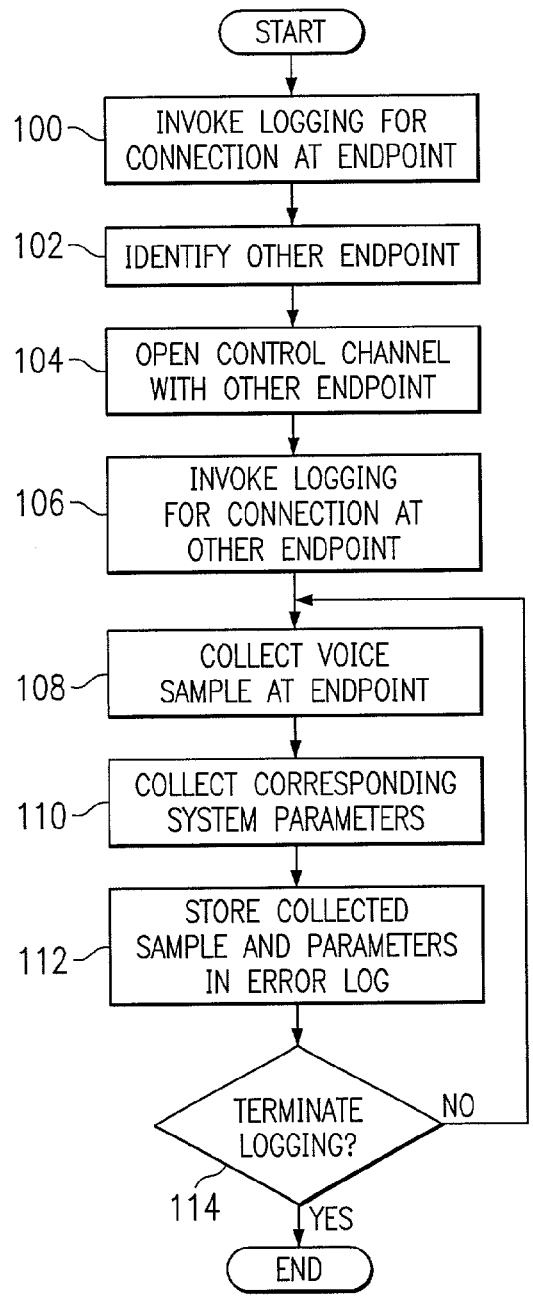
FIG. 4 is a flow diagram illustrating a method for collecting voice samples and associated information at a near side of a communication connection and initiating data collection at a remote side of the connection in accordance with one embodiment of the present invention.

FIG. 1 illustrates a communication system 12 in accordance with one embodiment of the present invention. In this embodiment, the communication system 12 is a distributed system transmitting audio, video, voice, data and other suitable types of real-time and non-real-time traffic between source and destination endpoints.

Referring to FIG. 1, the communication system 12 includes a network 14 connecting a plurality of communication devices 16 to each other and to standard telephony devices 18 through a gateway 20 and the public switched telephone network (PSTN) 22. The communication devices 16, telephony devices 18 and gateway 20 are connected to the network 14 and/or PSTN 22 through twisted pair, cable, fiber optic, radio frequency, infrared, microwave and/or any other suitable wireline or wireless link 24.

In one embodiment, the network 14 is the Internet, a wide area network (WAN), a local area network (LAN) or other suitable packet switched network in which information is broken down into datagrams for transmission. In the Internet embodiment, the network 14 transmits Internet protocol (IP) packets and includes a plurality of routers and/or other suitable network elements operable to direct the IP packets between source and destination endpoints. Telephony voice information is transmitted in the voice over IP (VoIP) format. Real-time IP packets such as VoIP packets are encapsulated in real-time transport protocol (RTP) packets for transmission over the network 14. It will be understood that the network 14 may comprise any other suitable types of network elements and that traffic may be otherwise suitably transmitted using other protocols and formats.

The network 14 may include and/or be coupled to a call manager 30. The call manager 30 may be located in a central facility or have its functionality distributed across and/or at the periphery of the network 14. The call manager 30 is connected to the network 14 by a suitable link 24. The call manager 30 sets up, tears down and otherwise manages communication connections 26 across the network 14. The communication connections 26 may be between two or more parties. The parties may be persons and/or equipment such as computers. The connections 26 may be real-time connections, connections having real-time characteristics and/or time-sensitive connections in which voice, including other audio is streamed over a packet switched network either alone or with other information for playing at a rate to a user. In another embodiment, the network 14 operates without the call manager 30, in which case the communication devices 16 and gateway 20 may communicate control information directly with each other or with other suitable network elements.

The communication devices 16 comprise IP or other digital telephones, soft phones, personal or other suitable computers or computing devices, personal digital assistants (PDAs), cell or other mobile telephones or any other suitable hand-held or other device capable of communicating real-time audio, video and/or other information over the network 14. The communication devices 16 also communicate control information with the network 14 to control call set up, tear down and processing as well as call services.

In the Internet embodiment, the communication devices 16 communicate voice traffic in the VoIP format. The telephony devices 18, such as standard analog telephones or computers communicating through modems, communicate standard telephony signals through PSTN 22 to gateway 20. At the gateway 20, the signals are converted to IP packets in the VoIP format and encapsulated in the RTP protocol for transmission over the network 14.

As described in more detail below, the communication devices 16, gateway 20, routers and switches and/or other suitable devices in the network 14 may log voice quality issues for VoIP and other suitable connections 26 over the network 14. In a particular embodiment, the endpoints 16 and 20 collect and store voice samples and corresponding system parameters for debugging and other analysis in response to a user or fault initiated signal indicating a technical or other type of problem with an ongoing connection 26. The problem may be dropped packets, interference, static, echo or other disruptions in the communication connection 26. The communication connection 26 may be a VoIP connection, telephony connection, video connection, real-time connection and/or other suitable connection 26 having time-sensitive data streamed across the network 14 between remote devices. Accordingly, an accurate representation of what the user is hearing and/or experiencing is logged for debugging analysis. This removes the language barrier that users typically have when they attempt to describe voice degradation issues.

In addition and/or alternatively to locally logging voice samples and associated information, the endpoint 16 or 20 at which the user initiated or other signal was received may identify the other endpoint to the connection 26 and open a control channel 28 to the other endpoint to initiate remote side logging. Accordingly, voice samples and associated information may be collected at each side of the connection 26 to facilitate debugging. In addition, if an endpoint experiencing problems is not able to collect information, information may still be collected at the other endpoint to provide some information to facilitate debugging. For example, the system may not be able to collect voice samples and parameters from telephony devices 18. To alleviate this problem, the gateway 20 may be instructed to collect voice samples representative of the user perceived voice.

FIG. 2 illustrates details of a communication device 50 in accordance with one embodiment of the present invention. In this embodiment, the communication device 50 as well as other components of the communication system 12 comprise logic encoded in media for implementing near side, far side and other suitable functionality of the system. Logic comprises functional instructions for carrying out program task upon execution. The media comprises computer disks or other computer-readable media, application specific integrated circuits (ASIC), field programmable gate arrays (FPGA), digital signal processors (DSP), other suitable specific or general processors, transmission media or other suitable media in which logic may be encoded and utilized.

Referring to FIG. 2, the communication device 50 includes a user interface 52, a network interface 54 and a processor 56. It will be understood that the communication device 50 may comprise other suitable components for communicating real-time, time-sensitive and other information over the network 14.

The user interface 52 includes a microphone, speaker, display, keypad, pointing device, touch screen, soft buttons, graphical user interface (GUI) and/or other suitable devices for receiving input from a user or providing output to the user. For an IP telephone, for example, the user interface 52 may include a speaker for playing received voice information to the user, a microphone for receiving voice information from the user and a keypad and/or touch screen with which the user may signal a problem with an ongoing connection 26. It will be understood that the user interface 52 may comprise other suitable components and that the user may otherwise suitably indicate a problem with a connection at the communication device 50.

The network interface 54 receives and processes packets from connections 26 over the network 14 and transmits packets on connections 26 in the network 14. In one embodiment, the network interface 54 includes a jitter buffer 60 for each connection 26. As used herein, each means every one of at least a subset of the identified items. The jitter buffer 60 receives packets 62 after processing by the network interface 54 and buffers the packet 62 for playing to the user by the user interface 52. Preferably, the jitter buffer 60 maintains a near-steady number of packets 62 to ensure sufficient packets to play for the user without overflowing. The number of packets in the jitter buffer 60 is dependent on the rate at which packets are received from the network 14 and the rate at which they are played to the user and/or dropped. The size of jitter buffer 60 may be dynamically varied depending on the quality of the associated connection 26.

The processor 56 includes a logging tool 70 and an error log 72. The logging tool 70 is operable in response to at least a local user initiated signal and/or a remote signal and/or a fault, alarm or other machine-generated signal to locally collect voice samples and corresponding system parameters of the device 50 and to store the collected information in the error log 72. The system parameters comprise lost/late packet 62 counts, convergence state of echo cancelers, a number of packets 62 stored in the jitter buffer 60, end-to-end latency of the connection 26 and other suitable debugging information. Debugging information is information directly or indirectly indicating a problem and/or solution to a problem with a connection, diagnostic information or other suitable information from which the problem and/or solution can be determined or derived.

The error log 72 maintains information collected by the logging tool 70. The error log 72 may be one or more files, database tables, or any other suitable data structures operable to associate voice samples and/or corresponding system parameters for a connection 26. After collection is complete, at the end of a call and/or at the beginning of debugging operations, for example, information from the error log 72 may be uploaded to a server in the network 14 for access by debugging operators. Alternatively, or in addition, the error log 72 may be directly accessed at the communication device 50. Similarly, information logged at another endpoint of the connection 26, may be uploaded to a same debugging or other server or transmitted to the near side error log 72 such that all debugging information for the connection 26 is stored together and may be readily accessed and analyzed during debugging operations.

FIG. 3 illustrates an error log 80 in accordance with one embodiment of the present invention. In this embodiment, the error log 80 includes time information 82, system parameter information 84 and audio information 86. The time information comprises absolute and/or relative time values, or data, 83 for synchronizing system parameters and audio information 84 and 86. It will be understood that system parameters and audio information may be otherwise suitably synchronized during or after sampling without departing from the scope of the present invention.

The system parameters 84 comprise system data 85 indicating operating conditions of the communication device 50, of the connection 26 or otherwise indicative of quality of the connection 26, such as quality of service (QoS) parameters, class of service (CoS) parameters and/or voice degradation parameters. As previously described, the system parameters may comprise one or more of lost/late packet 62 counts, convergence state of echo cancelers, a number of packets 62 stored in the jitter buffer 60, and end-to-end latency of the voice path. The audio information 86 comprises voice samples 87 also collected at the endpoint device 16 or 20.

During debugging operations, a system administrator may listen to the voice samples 87 while viewing corresponding system data 85 to determine the cause of voice degradation and facilitate correction of the problem. The system administrator may also compare voice samples 87 and system data 85 from the different endpoints of the connection 26 to determine if problems are occurring as packets are traversing the network 14 or at an endpoint device. It will be understood that the error log 80 and/or collected information may be otherwise suitably used for debugging operations and improvement of voice quality of VoIP and other suitable packet-switched connections as well as for other suitable purposes without departing from the scope of the present invention.

FIG. 4 is a flow diagram illustrating a method for logging voice samples and associated information at a near side endpoint where a user indicates a problem with a connection 26 and for initiating logging at a remote side endpoint of the connection 26 in accordance with one embodiment of the present invention. In this embodiment, the connection 26 is a VoIP connection in which voice information is transmitted between communication devices, which may include a telephony device 18 and gateway 20 combination. It will be understood that voice quality issues may be otherwise suitably logged at endpoints to facilitate debugging and other operations such as routers and switches within the network 14.

Referring to FIG. 4, the method begins at step 100 in which the user invokes, or initiates, logging for a problematic connection 26 at the near side endpoint by indicating the problem at the local device. The user may initiate logging by a button or voice activated or GUI based command or other command at the communication devices 16 and/or telephones 18 or a sequence of buttons or commands. For example, the user may initiate logging by a hard key, a soft key, a feature button or a sequence of keypad key presses.

Next, at step 102, the near side endpoint identifies the other endpoint or endpoints to the voice connection 26. In one embodiment, the other endpoint is identified with path analysis utility. At step 104, the near side endpoint opens a control channel 28 with a remote device at the other endpoint. At step 106, the near side endpoint invokes logging at the other endpoint by generating a logging signal and transmitting the signal to the other endpoint over the control channel 28.

Proceeding to step 108, the logging tool 70 of the near side endpoint locally collects voice samples 87 at the communication device 50 or other endpoint device. Corresponding system parameter data 85 are also locally collected at the endpoint by the logging tool 70 at step 110. At step 112, the collected samples and parameters 87 and 85 are stored temporarily or otherwise in the error log 72 by the logging tool 70. It will be understood that the samples and parameters 87 and 85 may be remotely stored in a server or other suitable device.

At decisional step 114, the logging tool 70 determines whether to terminate logging. The logging tool 70 may continue logging during the remainder of a call for which logging was initiated or may log for a predetermined and/or specified period of time and/or during a fault condition. If logging is not terminated, it will continue and the No branch of decisional step 114 returns to step 108 in which additional samples and parameters 87 and 85 are collected and continue to be stored until logging is complete. Upon termination of logging, the Yes branch of decisional step 114 leads to the end of the process by which voice quality issues are collected and/or stored at the communication device 50 or other suitable endpoint to provide an accurate representation of voice quality issues and thus to facilitate debugging operations.

Figure 5:
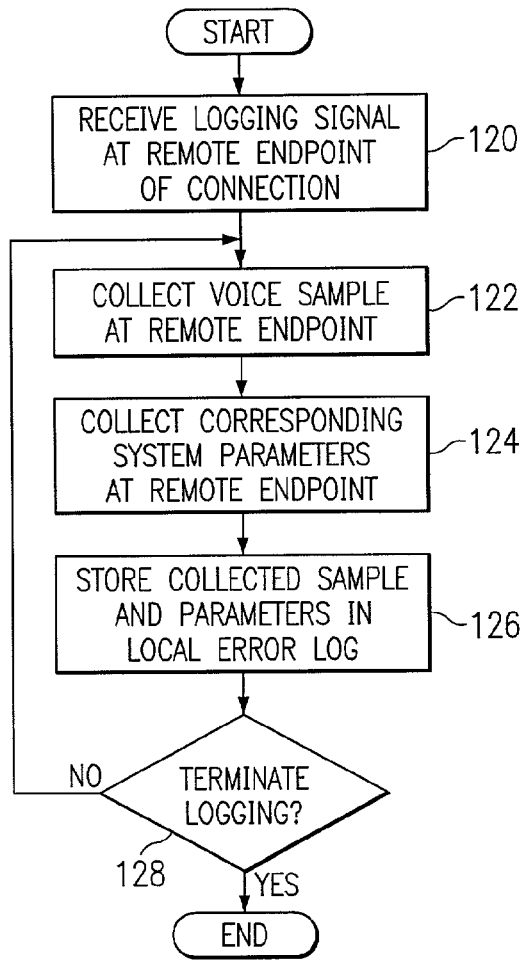
FIG. 5 is a flow diagram illustrating a method for collecting voice samples and associated information at the remote side of the communication connection in response to a request from the near side of the connection in accordance with one embodiment of the present invention.

FIG. 5 illustrates a method for logging voice quality issues at an endpoint of a connection 26 in response to a remote trigger mechanism in accordance with one embodiment of the present invention. In this initiated signal at an endpoint local to the user that is communicated over a control channel 28 initiated by that near side endpoint. It will be understood that logging of voice quality issues may be otherwise suitably triggered at a remote side of a connection in response to a request by a user at a local near side endpoint.

Referring to FIG. 5, the method begins at step 120 in which a logging signal is received at the remote endpoint from the near side endpoint for the voice connection 26. Proceeding to step 122, voice samples 87 are collected at the remote endpoint in response to at least receipt of the remotely triggered signal. At step 124, corresponding system parameter data 85 is collected. The collected samples and parameters 85 and 87 are stored in the local error log 72 at step 126.

Next, at step 128, the remote endpoint determines whether to terminate logging. As previously described in connection with the near side endpoint, the remote endpoint may log for the duration of the call in which logging has been invoked, for a predetermined or specified period of time, or until another signal is received to terminate logging over the control channel 28. If logging is not terminated, it will continue for the duration of the call and the No branch of decisional step 128 returns to step 122 for the collection and storage of additional samples 87 and associated parameters 85. If logging should terminate, the Yes branch of decisional step 128 leads to the end of the process. Accordingly, in one embodiment, data may be collected at both endpoints of a voice connection in response to problems occurring at one end to provide full information to facilitate debugging operations. Alternatively, if a near side endpoint in which a user initiates signals generated is unable to log voice quality issues for a problematic connection, the remote endpoint may log samples 87 and parameters 85 alone and/or in connection with network-based resources. Logging may be similarly performed by the routers and/or switches within the network 14.

Although the present invention has been described with several embodiments, various changes and modifications may be suggested to one skilled in the art. It is intended that the present invention encompass such changes and modifications as fall within the scope of the appended claims.

What is claimed is:

1. A method for logging voice quality issues, comprising:
receiving a signal from a user to initiate logging of quality information for a packet switched voice connection at an endpoint of the voice connection;
collecting, in response to the signal, voice samples from the voice connection at the endpoint;
storing the voice samples in an error log at the endpoint;
collecting system parameters indicative of quality of the voice connection at the endpoint;
storing the system parameters in the error log at the endpoint; and
associating the system parameters corresponding in time to a voice sample with the voice sample in the error log.

2. The method of claim 1, further comprising maintaining the error log at the endpoint.

3. The method of claim 1, wherein the signal comprises a locally initiated signal.

4. The method of claim 1, wherein the system parameters comprise a plurality of lost/late packet counts, convergent state of echo cancelers, number of packets stored in a jitter buffer and end-to-end latency of the voice connection at the endpoint.

5. The method of claim 1, wherein the endpoint is a first endpoint, further comprising signaling a second endpoint to the voice connection to log quality information for the voice connection at the second endpoint, the quality information including voice samples from the voice connection at the second endpoint.

6. The method of claim 5, further comprising identifying the second endpoint at the first endpoint.

7. The method of claim 6, further comprising:
opening a control channel to the second endpoint; and
signaling the second endpoint to log quality information over the control channel.

8. The method of claim 7, wherein the second endpoint comprises a gateway connected to a public switched telephone network (PSTN).

9. A system for logging voice quality issues, comprising:
means for receiving a signal from a user to initiate logging of quality information for a packet switched voice connection at an endpoint of the voice connection;
means for collecting, in response to the signal, voice samples from the voice connection at the endpoint;
means for storing the voice samples in an error log at the endpoint;
means for collecting system parameters indicative of quality of the voice connection at the endpoint;
means for storing the system parameters in the error log at the endpoint; and
means for associating the system parameters corresponding in time to a voice sample with the voice sample in the error log.

10. The system of claim 9, further comprising means for maintaining the error log at the endpoint.

11. The system of claim 9, wherein the signal comprises a locally initiated signal.

12. The system of claim 9, wherein the system parameters comprise a plurality of lost/late packet counts, convergent state of echo cancelers, number of packets stored in a jitter buffer and end-to-end latency of the voice connection at the endpoint.

13. The system of claim 9, wherein the endpoint is a first endpoint, further comprising means for signaling a second endpoint to the voice connection to log quality information for the voice connection at the second endpoint, the quality information including voice samples from the voice connection at the second endpoint.

14. The system of claim 13, further comprising means for identifying the second endpoint at the first endpoint.

15. The system of claim 14, further comprising:
means for opening a control channel to the second endpoint; and
means for signaling the second endpoint to log quality information over the control channel.

16. The system of claim 15, wherein the second endpoint comprises a gateway connected to a public switched telephone network (PSTN).

17. A system for logging voice quality issues, comprising:
logic encoded in media;
a processor for executing the logic; and
the logic operable to receive a signal from a user to initiate logging of quality information for a voice connection at an endpoint of the voice connection, collect voice samples from the voice connection at the endpoint in response to the signal, store the voice samples in an error log at the endpoint, collect system parameters indicative of quality of the voice connection at the endpoint, store the system parameters in the error log at the endpoint, and associate the system parameters corresponding in time to a voice sample with the voice sample in the error log.

18. The system of claim 17, the logic further operable to maintain the error log at the endpoint.

19. The system of claim 17, wherein the signal comprises a locally initiated signal.

20. The system of claim 17, wherein the system parameters comprise a plurality of lost/late packet counts, convergent state of echo cancelers, number of packets stored in a jitter buffer and end-to-end latency of the voice connection at the endpoint.

21. The system of claim 17, wherein the endpoint is a first endpoint, the logic further operable to signal a second endpoint to the voice connection to log quality information for the voice connection at the second endpoint, the quality information including voice samples from the voice connection at the second endpoint.

22. The system of claim 21, the logic further operable to identify the second endpoint at the first endpoint.

23. The system of claim 22, the logic further operable to:
open a control channel to the second endpoint; and
signal the second endpoint to log quality information over the control channel.

24. The system of claim 23, wherein the second endpoint comprises a gateway connected to a public switched telephone network (PSTN).

25. A method for logging voice quality issues, comprising:
receiving a signal initiated by a user at an endpoint indicating voice quality degradation of an ongoing voice connection;
collecting, in response to the signal, voice samples from the voice connection at the endpoint;
collecting system parameters indicative of quality of the voice connection at the endpoint, the system parameters corresponding in time to the voice samples;
synchronizing the system parameters with the voice samples; and
storing the voice samples and system parameters synchronously in an error log at the endpoint.

26. The method of claim 25, wherein the endpoint comprises a first endpoint, further comprising:
identifying a second endpoint of the voice connection;
opening a control channel to the second endpoint; and
signaling the second endpoint over the control channel to log quality information for the voice connection at the second endpoint.

27. The method of claim 25, wherein the system parameters comprise a plurality of loss/late packet counts, conversion state of echo cancelers, number of packets stored in a jitter buffer, and end-to-end latency of the voice connection at the endpoint.

28. The method of claim 25, wherein the voice connection comprises a voice over Internet protocol (VoIP) connection.

29. A method for logging voice quality issues, comprising:
receiving a signal from a user to initiate logging of quality information for a packet switched voice connection;
collecting, in response to the signal, first voice samples from the voice connection at an endpoint of the voice connection;
collecting second voice samples from the voice connection at a network node;
storing the first voice samples from the voice connection at the endpoint in a first error log;
storing the second voice samples from the voice connection at the network node in a second error log;
collecting first system parameters indicative of quality of the voice connection at the endpoint;
collecting second system parameters indicative of quality of the voice connection at the network node;
storing the first system parameters of the voice connection at the endpoint in the first error log;
storing the second system parameters of the voice connection at the network node in the second error log;
associating the first system parameters corresponding in time to a first voice sample with the first voice sample in the first error log; and
associating the second system parameters corresponding in time to a second voice sample with the second voice sample in the second error log.

30. The method of claim 29, further comprising maintaining an error log at the endpoint for locally collected samples.

31. The method of claim 29, wherein the signal comprises a signal initiated at the endpoint.

32. The method of claim 28, wherein the system parameters comprise a plurality of lost/late packet counts, convergent state of echo cancelers, number of packets stored in a jitter buffer and end-to-end latency of the voice connection at the endpoint.

33. The method of claim 28, wherein the endpoint is a first endpoint, further comprising signaling a second endpoint to the voice connection to log quality information for the voice connection at the second endpoint, the quality information including voice samples from the voice connection at the second endpoint.

34. The method of claim 33, further comprising identifying the second endpoint at the first endpoint.

35. The method of claim 34, further comprising:
opening a control channel to the second endpoint; and
signaling the second endpoint to log quality information over the control channel.

36. The method of claim 35, wherein the second endpoint comprises a gateway connected to a public switched telephone network (PSTN).

37. A method for logging voice quality issues, comprising:
- receiving a signal from a user to initiate logging of quality information for a packet switched voice connection at an endpoint of the voice connection;
- collecting, in response to the signal, voice samples from the voice connection at the endpoint, wherein the endpoint is a first endpoint;
- storing the voice samples in an error log at the endpoint; and
- signaling a second endpoint to the voice connection to log quality information for the voice connection at the second endpoint, the quality information including voice samples from the voice connection at the second endpoint.

38. The method of claim 37, further comprising identifying the second endpoint at the first endpoint.

39. The method of claim 38, further comprising:
- opening a control channel to the second endpoint; and
- signaling the second endpoint to log quality information over the control channel.

40. The method of claim 39, wherein the second endpoint comprises a gateway connected to a public switched telephone network (PSTN).

41. A system for logging voice quality issues, comprising:
- means for receiving a signal from a user to initiate logging of quality information for a packet switched voice connection at an endpoint of the voice connection;
- means for collecting, in response to the signal, voice samples from the voice connection at the endpoint, wherein the endpoint is a first endpoint;
- means for storing the voice samples in an error log at the endpoint; and
- means for signaling a second endpoint to the voice connection to log quality information for the voice connection at the second endpoint, the quality information including voice samples from the voice connection at the second endpoint.

42. The system of claim 41, further comprising means for identifying the second endpoint at the first endpoint.

43. The system of claim 42, further comprising:
- means for opening a control channel to the second endpoint; and
- means for signaling the second endpoint to log quality information over the control channel.

44. The system of claim 43, wherein the second endpoint comprises a gateway connected to a public switched telephone network (PSTN).

45. A method for logging voice quality issues, comprising:
- receiving a signal from a user to initiate logging of quality information for a packet switched voice connection;
- collecting, in response to the signal, voice samples from the voice connection at an endpoint of the voice connection, wherein the endpoint is a first endpoint;
- collecting voice samples from the voice connection at a network node;
- storing the voice samples from the voice connection at the endpoint in a first error log;
- storing the voice samples from the voice connection at the network node in a second error log; and
- signaling a second endpoint to the voice connection to log quality information for the voice connection at the second endpoint, the quality information including voice samples from the voice connection at the second endpoint.

46. The method of claim 45, further comprising identifying the second endpoint at the first endpoint.

47. The method of claim 46, further comprising:
- opening a control channel to the second endpoint; and
- signaling the second endpoint to log quality information over the control channel.

48. The method of claim 47, wherein the second endpoint comprises a gateway connected to a public switched telephone network (PSTN).

* * * * *